INVENTOR.
ROELF JAN MEIJER
BY
Frank R. Trifari
AGENT

United States Patent Office 3,011,306
Patented Dec. 5, 1961

3,011,306
HEATING UNIT FOR HOT-GAS ENGINE
Roelf Jan Meijer, Emmasingel, Eindhoven, Netherlands, assignor to North American Philips Company, Inc., New York, N.Y., a corporation of Delaware
Filed Feb. 2, 1959, Ser. No. 790,489
Claims priority, application Netherlands Feb. 12, 1958
3 Claims. (Cl. 60—24)

The present invention relates to a preheater and a discharge system for a hot-gas reciprocating engine. In order to permit a sufficient amount of combustion air to be supplied to the combustion chamber of a hot gas engine the combustion air is admitted to the combustion chamber at a slight overpressure. This may be effected, for example, by means of a fan. If such a fan is arranged at the supply side of the installation, it is necessary to ensure that the air is supplied to the preheater in an even distribution throughout its periphery and for this purpose the preheater is usually surrounded by an air channel. Apart from the fact that even with the use of such an air channel the uniform supply of combustion air throughout the periphery of the preheater is doubtful, the presence of the air channel in engines having two or more juxtaposed cylinders has the additional disadvantage that such air channels make it necessary for the center lines of adjacent cylinders to be arranged at a distance from one another. This distance is larger than would be the case in the absence of such air channels.

The hot-gas reciprocating engine according to the present invention comprises a combustion chamber and a pre-heater for the combustion air which surrounds the combustion chamber and has the desirable features that while the preheater has apertures for the admittance of combustion air from the atmosphere surrounding the engine, the pipe line for discharging the exhaust gases from the combustion chamber includes a fan. With the foregoing construction it is thus ensured that comparatively voluminous channels for the supply of combustion air to the preheater are not required and furthermore a considerably more uniform distribution of the combustion air throughout the periphery of the preheater is established.

When the present invention is applied to an engine having two or more cylinders, the pipe lines for discharging the exhaust gases of the cylinders in one embodiment of the invention preferably empty into one common pipe line which includes the fan.

Heater pipes such as contemplated in the present invention are disclosed in U.S. Patent No. 2,621,474 to Dros et al.

Figure 1:
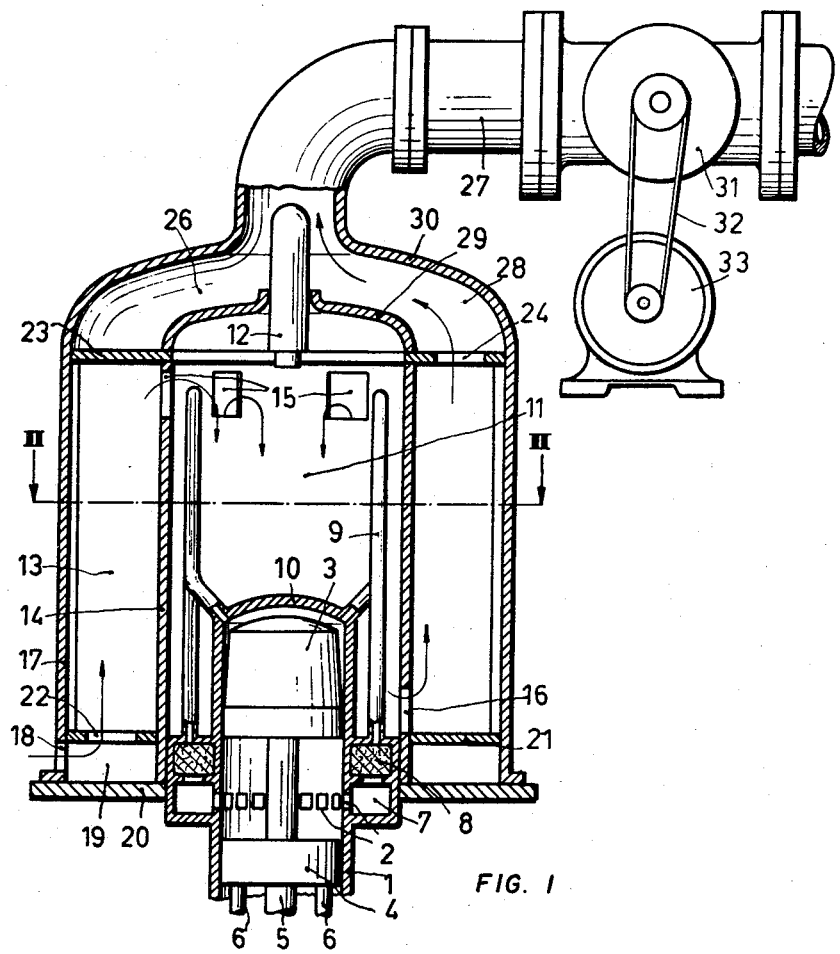
Figure 2:
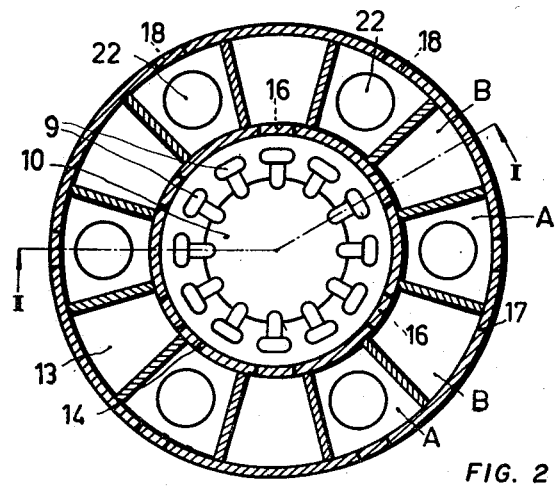
Figure 3:
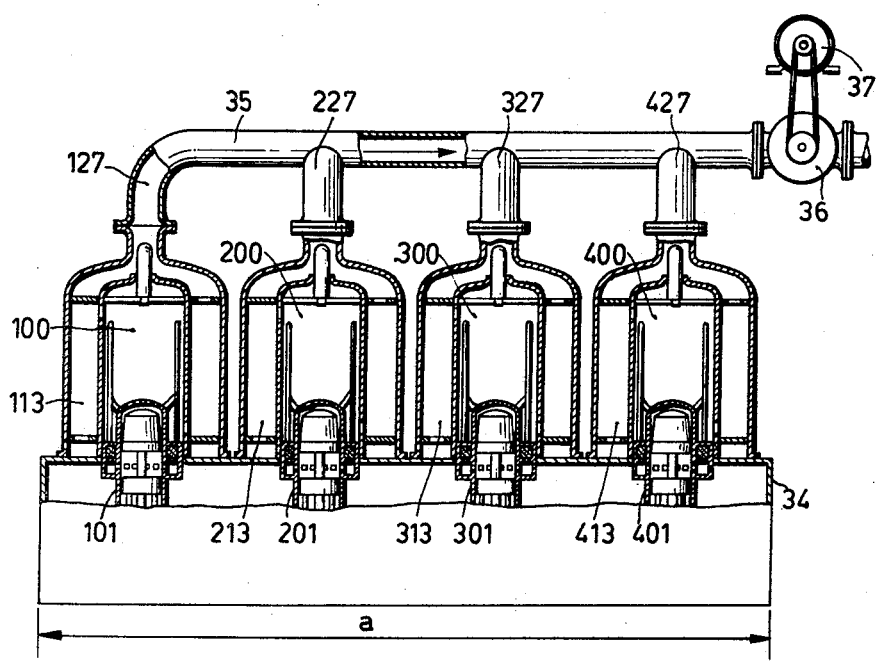

FIG. 1 is a partial vertical section and elevation view of the preheater and cylinder with piston and displacer of a hot gas engine and taken on lines I—I of FIG. 2., FIG. 2 is a sectional view taken along the lines II—II of FIG. 1 and FIG. 3 is a partial vertical section and elevation view of a multi-cylinder engine illustrating a common outlet.

Referring now to FIGS. 1 and 2, the lining of the cylinder is indicated by the numeral 1. Within this lining a displacer 3 and a piston 4, are movable. These members are connected to a drive (not shown) by means of connecting rods 5 and 6. A cooler 7, a regenerator 8 and a heater 9 are arranged in such a manner that they surround the cylinder lining 1. This lining is also provided with openings or gates 2. The heater 9 consisting of a number of U-shaped tubes encloses a combustion space 11, in the upper part of which a burner 12 is located. The supply lines for the fuel and the primary combustion air are disposed in directions perpendicular to the plane of the drawing so that they are not visible in FIG. 1. The heater 9 is enclosed by a cylindrical heat exchanger 13 acting as a preheater for the combustion air. The inner wall of this preheater in indicated with the reference numeral 14. This wall is provided with openings or gates 15 at its upper side and at its bottom part with further gates 16 with locations displaced tangentially with respect to the locations of the gates 15. The outer wall 17 of the heat exchanger 13 shows at its bottom part a number of gates 18 opening up to a conduit 19 surrounding the heat exchanger over its whole circumference. The heat exchanger 13 is carried by a base plate 20. This plate itself acts also as a closure member for the bottom side of the conduit 19. The upper side of the conduit 19 is bounded by a ring shaped member 21 having gates 22. The upper surface of the heat exchanger 13 is closed by a further ring shaped member 23, the latter being provided with bores 24. The space bounded by the inner wall 14 and outer wall 17 and the ring shaped members 21 and 33 is sub-divided by radial plate shaped members 25 which extend from the wall 14 to the wall 17. The spaces thus obtained are indicated with A and B. Each of the spaces A is in communication with the atmosphere through the gates 18 and 22. Apart therefrom these spaces communicate with the combustion space 11 through the gates 15. The spaces B communicate through the gates 16 with the combustion space and through the gates 24 with a space 26. This space 26 is in open connection with the tubular outlet pipe line 27. From the foregoing, it will be clear that the spaces A and B are only in communication with each other through the combustion chamber 11.

On top of the heat exchanger 13 a double wall member 28 is provided. Its inner wall 29 forms the closure member for the combustion space 11. Between this inner wall and the outer wall 30 of this member 28 the space 26 is present. A ventilator 31 is arranged in the outlet line 277. This ventilator is through a belt 32 coupled to an electric motor 33.

The operation of the device will now be explained in detail: The thermodynamic cycle of the engine takes place in the space confined by the cylinder wall 1, the cooler 7, the regenerator 8, the heater 9 and also in the space bounded by the upper side of the displacer 3 and the cylinder top 10 and the space present between the under side of the displacer 3 and the upper side of the piston 4. The gaseous medium performing this thermodynamic cycle is compressed at a relatively low temperature in the space between the piston 4 and the displacer 3. After its compression and partly also during this compression the medium flows through the cooler 7, the regenerator 8 and the heater 9 to a further space of variable volume confined between the upper surface of the displacer and the top 10 of the cylinder. During its passage through the regenerator and the heater the gaseous medium is heated. In the space between the displacer 3 and the cylinder top 10 the gas of a temperature higher than the temperature of the gas during its compression expands. As a result of this expansion a certain amount of mechanical energy is developed, part of which is given off to the main axis of the drive with which the engine is provided, and is used as the profitable mechanical energy of the engine. During and after this exxpansion the gaseous medium flows through the heater 9, regenerator 8 and cooler 7 back to the space between the piston 4 and the displacer 3. Both in the regenerator 8 and the cooler 7 this gas is cooled.

In order to give the gaseous medium the necessitated temperature heat is supplied to the heater by means of the burner in which liquid fuel together with air is burned in the combustion space 11. The primary combustion air enters the combustion space together with the fuel through the burner 12. The secondary combustion air is supplied to the combustion space 11 by means of the gates 15. Due to the presence of the ventilator 31 in the outlet 27 a pressure lower than the atmospheric pressure is maintained. This results in a flow of combustion gases from the combustion space 11 through the gates 16, the spaces B and the gates 24 to the exit 27. By means of the walls 25 the gases in the spaces A are in heat exchanging contact with the gases in the spaces B. Resulting from the fact that the gates are regularly disposed across the circumference of the constructional parts in question, the supply of atmospheric air to the combustion space is quite regularly distributed along the circumference of the combustion chamber, thus equalizing the combustion as much as possible.

FIG. 3 shows the application of the principles according to FIGS. 1 and 2 in a four in-line cylinder engine.

The four cylinders 101, 201, 301 and 401 show coolers, regenerators, heaters and heat exchangers 113, 213, 313, 413. The four cylinders are carried by a common base plate 34. The thermo-dynamic cycles taking place in each of the cylinders are completely independent from one another. Each of the engines 100, 200, 300 and 400 is identical with the engine as shown in FIGS. 1 and 2. Due to the presence of the common tubular outlet pipe line 35 and the ventilator 36, which is driven by an electric motor 37 it is possible to arrange the four cylinders 100, 200, 300 and 400 quite close to one another. This results in a relatively small over all length $a$ of the base plate.

Notwithstanding the close proximity of the cylinders the supply of atmospheric air to each of the cylinder takes place quite regularly. The flue gases from each of the burners are conducted through the outlets 127, 227, 327 and 427 to the common outlet pipe line 35.

What is claimed is:

1. A preheater and exhaust system for a hot gas engine including a cylinder, a gaseous medium therein, at least one piston adapted for reciprocation in said cylinder to produce work, a heater, a regenerator and a cooler being interconnected and forming a passageway for said gaseous medium to thereby operate said piston, said engine being provided with output means connected to said piston and a combustion chamber surrounding said heater and cylinder head comprising; a preheater embracing said cylinder head and said combustion chamber having a plurality of apertures in the latter for the admission of atmospheric combustion air therethrough, said chamber having a burner therein, a pipeline for the discharge of exhaust gases in said chamber connected to said chamber, a fan in said pipeline to assist in the discharge of said exhaust gases, and means for driving said fan.

2. A preheater and exhaust system for a multicylinder hot gas engine including a cylinder, a gaseous medium therein, at least one piston adapted for reciprocation in said cylinder to produce work, a heater, a regenerator and cooler being interconnected and forming a passageway for said gaseous medium to thereby operate said piston, said engine being provided with an output means connected to said piston and a combustion chamber surrounding said heater and cylinder head comprising; a preheater embracing said cylinder head and combustion chamber having a plurality of apertures in the latter for the admission of atmospheric combustion air therethrough, said chamber having a burner therein, a common pipeline for the discharge of exhaust gases in said chamber being connected to each of said chambers, a fan in said common pipeline to assist in the discharge of said exhaust gases, and means for driving said fan.

3. A preheater and exhaust system for a hot gas engine as claimed in claim 1 wherein said apertures in the preheater are arranged spatially and circumferentially around said heater.

References Cited in the file of this patent

UNITED STATES PATENTS

| | | |
|---|---|---|
| 1,678,396 | Koenig | July 24, 1928 |
| 2,621,474 | Dros et al. | Dec. 16, 1952 |
| 2,885,855 | Meyer | May 12, 1959 |